No. 872,416. PATENTED DEC. 3, 1907.
J. R. HATMAKER.
CHOCOLATE AND COCOA COMPOUND AND PROCESS OF MAKING SAME.
APPLICATION FILED JAN. 9, 1905.
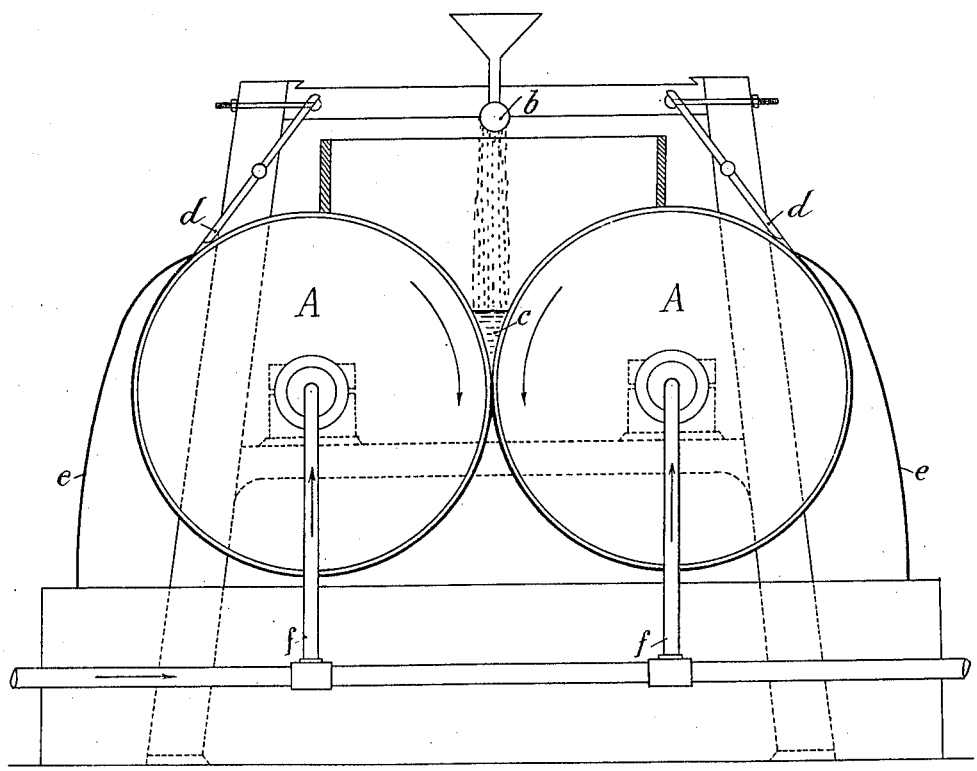
Witnesses.
William S. Magill
Octave de Carlsr
Inventor:
James R Hatmaker

UNITED STATES PATENT OFFICE.

JAMES ROBINSON HATMAKER, OF PARIS, FRANCE.

CHOCOLATE AND COCOA COMPOUND AND PROCESS OF MAKING SAME.

No. 872,416.    Specification of Letters Patent.    Patented Dec. 3, 1907.

Application filed January 9, 1905. Serial No. 240,353.

To all whom it may concern:

Be it known that I, JAMES ROBINSON HATMAKER, a citizen of the United States, residing at No. 25 Rue de la Faisanderie, Paris, France, have invented new and useful Improvements in Chocolate and Cocoa Compounds and Processes of Making Same, of which the following is a description.

This invention relates to the production of new dry homogeneous compounds of cacao, sugar and milk, in light, flaky form, by drying liquid mixtures or solutions of those substances.

The cacao beans are prepared for use in the ordinary way by roasting and shelling and crushing or melting them to a liquid state. The cacao thus prepared may contain its natural fat or it may be deprived of a portion or of all of it, and the milk may be liquid full-cream milk or separated-milk or partly-separated milk.

I will describe the production of a dry homogeneous compound of cacao, milk and sugar, in accordance with my invention. I prepare a liquid mixture of these substances in any suitable way as by melting cakes of cacao in hot water and then mixing it, and the sugar, with the liquid milk. Vanilla or other suitable substances may be added to improve the taste or the quality of the dry product to be obtained. If the cacao contains its natural fat (cacao butter) the mixture should be kept warm so as to prevent congelation of its fat, but if cocoa powder is used it need not be kept warm. I then dry the said liquid mixture or solution rapidly by exposing it in a thin uniform film or layer upon a surface heated sufficiently high to cause a rapid, almost instantaneous, evaporation of its contained water—as upon a surface heated somewhat in excess of 212° F. under ordinary conditions of atmospheric pressure—until it contains only sufficient moisture for the preservation of the solid ingredients in a dry normal state. I then remove the solid residues from such heated surface. While I wish it understood that I do not confine myself in the production of these new homogeneous compounds to the use of any particular drying apparatus, I will describe their production upon a twin-cylinder drying machine, heated to a temperature in excess of 212° F., as I have found their production in that manner advantageous. Such drying machines are well-known being composed of two smooth-faced drying cylinders placed parallel and slightly separated from each other and revolving inversely, the said cylinders being heated interiorly by steam or otherwise. A section of such a machine is shown in the accompanying drawing. The liquid mixture is fed continuously between the revolving cylinders A A, (which are heated so as to have a surface temperature somewhat in excess of 212° F.—as by a pressure of about 25 lbs. of steam per sq. in. introduced within the cylinders through inlets $ff$) from the supply-pipe $b$. A small depth of the liquid mixture or solution is maintained in the space $c$ between the upper halves of the faces of the slightly-separated cylinders. It is carried between the cylinders as they revolve, being spread out thereon in a very thin uniform layer or film, where it remains until it comes into contact with a stripping-knife $d\ d$ or other removing means fixed at a suitable point and held in contact with each cylinder. The film of solid material $e\ e$ is thus removed in very thin moist continuous sheets before it is overheated and injured. It becomes dry immediately upon cooling and is easily reduced to a light flaky powder by being passed through a sieve.

As the dry product contains a large percentage of sugar, in addition to the sugar of milk contained in the milk, the drying machine, in such cases, should be speeded so as to prevent the exposure of the solids upon the heated cylinders for too long a time. The sugar should not be allowed to melt and cause the solids to become sticky upon the cylinders. And it is also of importance that the portion of water unevaporated which gives to the hot film its moist appearance should be left in the product as hereinbefore described (the product being removed from the cylinders while it is still somewhat moist) as this water serves to supply the requirements of the cooling film and insures the preservation of the solids in a normal state.

A good homogeneous dry compound of cacao, sugar and milk in light, flaky form composed approximately of 22% cacao, 28% sugar and 50% milk solids—a compound from which good liquid drinking chocolate can be made by the addition of hot water—can be produced by drying a liquid mixture composed of 22 parts by weight of cacao, 28 parts by weight of sugar and 450 parts by weight of liquid milk from which one-half the cream has been separated (or about 400 parts by weight of full-cream milk).

By employing cacao with all or only a part of its natural fat with milk containing all or only a part of its cream results varying in fat contents may easily be produced. For example a compound highly desirable for persons who wish to avoid fat may be made by drying a liquid mixture of cacao powder, sugar and separated milk. A good example of such a compound is one composed of about 20% cocoa powder, 30% sugar and 50% separated milk solids, obtained by drying a liquid mixture composed of 20 parts by weight of cacao powder, 30 parts by weight of sugar and 550 parts by weight of separated milk. But it is to be understood that my invention is not limited to compounds of these proportions of ingredients. The proportions of ingredients of my dry homogeneous compounds of cacao, sugar and milk, in light, flaky form, may be varied greatly without departing from the spirit of my invention.

The dry compounds obtained by drying liquid mixtures or solutions of cacao, sugar and milk, as described above are homogeneous and uniform in character and in light, flaky, soluble form. Furthermore they are sterile and conservable. They are much less compact and much lighter in weight, volume for volume, than ground cacao, sugar and milk pastes or mechanical or ground mixtures of cacao, sugar and dry milk and easily distinguishable from them.

What I claim as my invention and desire to secure by Letters Patent is:

1. Cacao, sugar and milk homogeneously combined and sterile and in light, dry, flaky form, substantially as described, each flake of the product being composed of the said homogeneous compound.

2. The hereinbefore described homogeneous sterile food compounds, in light, dry, flaky form, consisting approximately of 20 parts of cacao, 30 parts of sugar and 50 parts of milk solids, each flake of the said compounds being composed of a homogeneous compound of the said elements.

3. The hereinbefore described process of producing dry homogeneous compounds of cacao, sugar and milk solids in light, dry, flaky form, consisting of making a solution of cacao, sugar and liquid milk in approximately the proportions specified, and in rapidly evaporating its contained water by exposing the said solution, in a very thin film, upon a suitable surface heated sufficiently high to cause a rapid evaporation of its contained water until it is reduced to a solid yet slightly moist state and in then removing the resulting compound from the said surface, the said solution being fed upon the drying surface in such restricted quantity as to avoid its being greatly reduced in bulk prior to the formation of the film.

4. The hereinbefore described process of producing dry sterile homogeneous compounds of cacao, sugar and milk solids in light, dry, flaky form, consisting of making a solution of cacao, sugar and liquid milk in approximately the proportions specified and in rapidly evaporating its contained water by exposing the said solution, in a very thin film, upon a suitable surface heated in excess of 212° F. until it is reduced to a solid yet moist state, and in the removing the resulting compound from the said surface, the said solution being fed upon the drying surface in such restricted quantity as to avoid its being greatly reduced in bulk prior to the formation of the film.

In testimony whereof I have signed my name to this specification in the presence of two subscribing witnesses.

JAMES ROBINSON HATMAKER.

Witnesses:
L. A. KLEIN CHALONS,
R. LEIPOLD.